United States Patent [19]
Jacob et al.

[11] Patent Number: 5,474,635
[45] Date of Patent: Dec. 12, 1995

[54] JOINING NON-COPLANAR PANELS AND STRUCTURES OF FIBER REINFORCED COMPOSITES

[75] Inventors: Bernarr A. Jacob, New Hartford; John E. Holowczak, Windsor; Philip H. McCluskey, Manchester; Willard H. Sutton, Glastonbury, all of Conn.

[73] Assignee: United Technologies Corporation, Hartford, Conn.

[21] Appl. No.: 206,809

[22] Filed: Mar. 7, 1994

[51] Int. Cl.$^6$ .................................................. B32B 31/00
[52] U.S. Cl. ........................... 156/257; 156/89; 156/163; 156/164; 156/178; 156/258; 156/285; 264/87
[58] Field of Search ...................................... 156/163, 164, 156/178, 257, 258, 285, 89; 264/87

[56] References Cited

U.S. PATENT DOCUMENTS

| | | | |
|---|---|---|---|
| 4,256,533 | 3/1981 | Mayer | 156/633 |
| 4,314,852 | 2/1982 | Brennan et al. | 501/88 |
| 4,324,843 | 4/1982 | Brennan et al. | 428/697 |
| 4,341,826 | 7/1982 | Prewo et al. | 428/35 |
| 4,591,401 | 5/1986 | Neidig et al. | 156/89 |
| 4,613,473 | 9/1986 | Layden et al. | 264/103 |
| 4,666,645 | 5/1987 | Prewo et al. | 264/87 |
| 4,668,333 | 5/1987 | Tandon et al. | 156/633 |
| 4,681,646 | 7/1987 | Pinto et al. | 156/157 |
| 4,780,160 | 10/1988 | Kipp | 156/89 |
| 4,857,485 | 8/1989 | Brennan et al. | 501/7 |
| 4,940,847 | 7/1990 | Gramberger | 156/89 |
| 5,161,300 | 11/1992 | Nanjyo | 29/603 |

*Primary Examiner*—James J. Bell
*Attorney, Agent, or Firm*—George J. Romanik

[57] ABSTRACT

A method of joining adjacent, non-coplanar, fiber reinforced composite structures includes machining a plurality of serrations (4) into an edge (6) of a consolidated first fiber reinforced composite structure (2) such that reinforcing fibers continue from a main body (14) of the first fiber reinforced composite structure (2) into the serrations (4). One or more reinforcing fiber plies (16) are then laid up around the serrations (4) to form an unconsolidated second structure such that the serrations (4) protrude through at least one reinforcing fiber ply (16). In addition to the one or more reinforcing fiber plies (16), the unconsolidated second structure also includes a matrix precursor. Sufficient heat and pressure are applied to the unconsolidated second structure and the serrations (4) to consolidate the second structure into a fiber reinforced composite structure (8). The heat and pressure also cause the fibers in the serrations (4) to intermingle with the fibers in the second structure (8) to securely join the second structure (8) to the first fiber reinforced composite structure (2). The invention also includes a fiber reinforced composite article made with this method.

11 Claims, 4 Drawing Sheets

JOINING NON-COPLANAR PANELS AND STRUCTURES OF FIBER REINFORCED COMPOSITES

This invention was made with Government support under contract number F33615-91-C-2151, awarded by the Department of the Air Force. The Government has certain rights in this invention.

TECHNICAL FIELD

The present invention is directed to a method of joining fiber reinforced composites, particularly fiber reinforced glass, glass-ceramic, or ceramic composites.

BACKGROUND ART

Over the past decade, the demand for strong, light-weight materials has led to the increasing use of fiber reinforced composites for a variety of applications. For example, composites are often used as structural materials in airframes or for various components in gas turbine engines. Fiber reinforced composites typically comprise a plurality of fibers dispersed in a continuous matrix. Depending on the application, the matrix may be a polymer, a metal, a metalloid, a glass, a glass-ceramic, or a ceramic. Polymer matrices are usually used for lower temperature applications, while metal, metalloid, glass, glass-ceramic, and ceramic matrices are typically used for higher temperature applications. Glass-ceramic and ceramic matrices often are useful at temperatures up to and above those allowable for metal matrices. Regardless of the application, the increasing use of composite materials has created a need to join adjacent, non-coplanar composite panels and structures to form complex shapes.

Although several techniques are available for joining polymer matrix composite structures, relatively few methods for joining metal, metalloid, glass, glass-ceramic, and ceramic matrix composite structures exist. Many of the existing techniques for joining metal, metalloid, glass, glass-ceramic, and ceramic matrix composite structures rely on bonding adjoining matrices to each other. Because such joints provide a bond only between the matrices, however, they typically have the characteristics of an unreinforced metal, metalloid, glass, glass-ceramic, or ceramic. As a result, such joints can be considerably weaker than the base composites themselves and can be unsuitable for many applications.

Therefore, what is needed in the industry is an improved method for joining fiber reinforced composite structures, particularly those made with glass, glass-ceramic, or ceramic matrix fiber reinforced composites.

DISCLOSURE OF THE INVENTION

The present invention is directed to a method for joining fiber reinforced composite structures, particularly those made with glass, glass-ceramic, or ceramic matrix fiber reinforced composites.

One aspect of the invention includes a method of joining adjacent, non-coplanar, fiber reinforced composite structures. The method includes machining a plurality of serrations into an edge of a consolidated first fiber reinforced composite structure such that reinforcing fibers are continuous from a main body of the first fiber reinforced composite structure into the serrations. One or more reinforcing fiber plies (e.g., tows, tapes, or cloth) are then laid up around the serrations to form an unconsolidated second structure such that the serrations protrude through at least one reinforcing fiber ply. In addition to the one or more reinforcing fiber plies, the unconsolidated second structure includes a matrix precursor. Sufficient heat and pressure are applied to the unconsolidated second structure and the serrations to consolidate the second structure into a fully consolidated fiber reinforced composite structure. The heat and pressure also cause the fibers in the serrations to intermingle with the fibers in the second structure to securely join the second structure to the first fiber reinforced composite structure.

Another aspect of the invention includes a fiber reinforced composite article that includes a first fiber reinforced composite structure and a second fiber reinforced composite structure. The first fiber reinforced composite structure has at least one serration along an edge. Reinforcing fibers are continuous from a main body of the first fiber reinforced composite structure into the serration. The second fiber reinforced composite structure is positioned around the serration of the first fiber reinforced composite structure such that the serration protrudes into the second fiber reinforced composite structure. The reinforcing fibers in the serration intermingle with fibers in the second fiber reinforced composite structure to securely join the second fiber reinforced composite structure to the first fiber reinforced composite structure.

These and other features and advantages of the present invention will become more apparent from the following description and accompanying drawing.

BEST MODE FOR CARRYING OUT THE INVENTION

Figure 2:
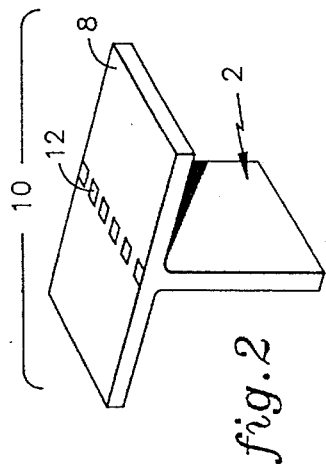
FIG. 2 is a perspective view of two composite structures joined by the joint of the present invention.
Figure 5:
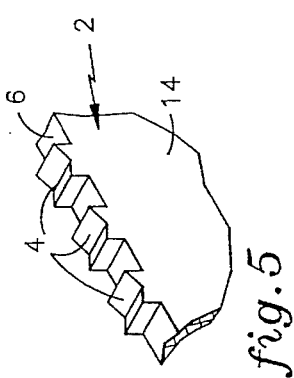
Figure 1:
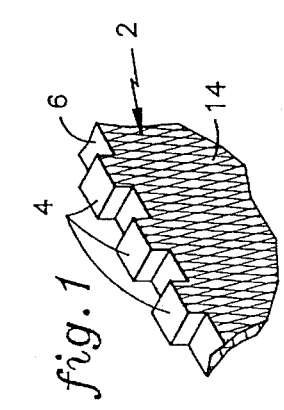
FIG. 1 is a perspective view of a consolidated composite structure having serrations of the present invention.
Figure 4:
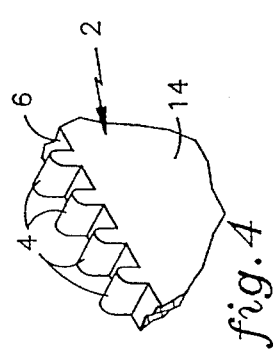

The present invention provides a strong, tough joint between adjacent, non-coplanar fiber reinforced composite structures by allowing considerable intermingling between the fibers in both structures. As shown in FIG. 1, a first fiber reinforced composite structure 2 has a plurality of serrations 4 machined into an edge 6. When a second fiber reinforced composite structure 8 is consolidated with the first structure 2 to form a fiber reinforced composite article 10, as shown in FIG. 2, the serrations 4 help form a secure joint 12 between the first structure 2 and the second structure 8. For simplicity, the rest of the application will describe the present invention in the context of joining non-coplanar panels. One skilled in the art, however, will understand that the present invention may be used to join a wide variety of structures in addition to flat panels.

The present invention can be used with any fiber reinforced composites, including composites in which the matrix is a polymer, metal, metalloid (e.g., silicon and others), glass, glass-ceramic, or ceramic. Preferably, the matrix will be a glass, glass-ceramic, or ceramic because composites with such matrices are comparatively difficult to join with conventional techniques. As used in this application, glass-ceramic means a material that can be processed in a glassy state and subsequently heat treated to crystallize a refractory ceramic phase. Suitable glass or glass-ceramic matrices include lithium aluminosilicate, calcium aluminosilicate, magnesium aluminosilicate, barium magnesium aluminosilicate, aluminosilicates (including mullite), borosilicates, oxynitrides, oxycarbides, or any other oxide or nonoxide glasses or glass-ceramics. Suitable ceramic matrices include silicon nitride ($Si_3N_4$), silicon carbide (SiC), Si—N—C—O, alumina, titanium boride ($TiB_2$), titanium carbide (TiC), zirconium carbide (ZrC), zirconium boride ($ZrB_2$), or other conventional ceramic matrix materials.

The reinforcing fibers in the composite may be any conventional fibers compatible with the matrix. For example, the fibers may be carbon, graphite, silicon carbide, alumina, aluminosilicate (including mullite), silica, silicon nitride, Si—N—C—O, or any other conventional fibers. Suitable SiC-based fibers include NICALON® or carbon-coated NICALON® fibers (Nippon Carbon Co., Tokyo, Japan), SiC monofilament fibers (Textron Inc., Lowell, Mass.), silicon carbide/tungsten fibers available from British Petroleum Corporation (Cleveland, Ohio), TYRANNO® fibers (Ube Industries Ltd., Ube City, Japan), and stoichiometric SiC fibers such as those under development at Dow-Corning Company (Midland, Mich.) and Carborundum Company (Niagara Falls, N.Y.). Suitable Si—N—C—O fibers include HPZ fibers (Dow-Corning Corporation). Any of these fibers can be used alone or in combinations that would produce composite articles having desired properties. The fibers can be used as fabricated or after applying a suitable interfacial coating. The reinforcing fibers may be used as either discontinuous or continuous fibers in the form of a tow, tape or cloth. In either case, at least some reinforcing fibers in the first structure 2 should be continuous from a main body 14 of the first structure into the serrations 4. Preferably, substantially all the fibers in the first structure 2 and second structure 8 will be continuous fibers because such fibers impart greater structural strength to the composites and the overall composite structure.

As a preliminary step, the first structure 2 may be made with conventional methods suitable for the selected combination of matrix and reinforcing fibers. For example, the structure may be made by laying up one or more plies of a tow, tape, or cloth of continuous reinforcing fibers in a desired orientation. Preferably, the tow, tape, or cloth will be impregnated with a powdered glass, glass-ceramic, or ceramic according to conventional prepregging methods. If the reinforcing fibers are not prepregged, the matrix may be introduced separately as a loose powder, fiber, cloth, viscous fluid, or by any other conventional method. For example, the first structure 2 may be made by laying up alternating plies of a cloth of reinforcing fibers and a cloth of fibers made from the matrix material. Alternately, a cloth made from both reinforcing fibers and matrix fibers may be used. If desired, the first structure 2 may be made from one or more plies of a prepregged chopped fiber material, such as a tape. Suitable methods for making the composite structure 2 are well known in the art and are described in commonly owned U.S. Pat. Nos. 4,341,826 to Prewo et al., 4,613,473 to Layden et al., and 4,857,485 to Brennan et al. and elsewhere in the technical literature. Although the orientation of reinforcing fibers in the first structure 2 is not critical to the overall inventive concept of the present invention, certain fiber orientations have been found to be particularly advantageous for certain applications. For example, ±15° to the vertical (as shown in FIG. 1) and 0°/90° (i.e., alternating horizontal and vertical) orientations have worked well. In addition to these fiber orientations in the first structure 2, any other orientation may be used. After lay up the plies may be hot pressed, sintered, or hot isostatic pressed under a suitable temperature and pressure with conventional methods to consolidate (debulk) them from their initial thickness to form the first structure 2. In the context of this application, a consolidated structure (i.e., one that is formed by consolidating reinforcing fiber plies) is one that has a controlled level of porosity. Consolidated structures with glass or glass-ceramic matrices may have little or no porosity. The temperature and pressure used to hot press, sinter, or hot isostatic press the first structure 2 should be sufficient to cause the matrix soften and flow or sinter, forming a continuous material. One skilled in the art can readily select a suitable temperature, pressure, and method of applying pressure based on the matrix and fiber used to make the first structure 2.

Figure 3:
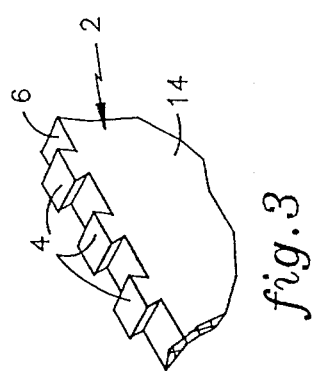
FIGS. 3–5 are perspective views of composite structures having alternate serration configurations.
Figure 6:
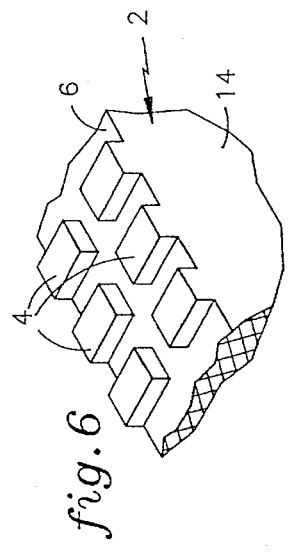
FIG. 6 is a perspective view of a composite structure having a double row of serrations of the present invention.

After consolidation, an edge of the first structure 2 may be machined to form at least one serration 4 that has any convenient shape that facilitates an intermingling between fibers of the first structure 2 and fibers of the second structure 8. For example, the serration 4 may have a rectangular cross-section as in FIG. 1 or any other suitable cross-section, including those shown in FIGS. 3 (keystone), 4 (arcuate), or 5 (notched). Preferably, the first structure 2 will have a plurality of serrations 4. The number of serrations 4 in the first structure 2 is a design criterion that one skilled in the art can alter to meet specific design requirements. The serrations 4 may be formed with any conventional machining methods, such as superabrasive diamond grinding, laser machining, water-jet cutting, or any other suitable technique, and may be arranged in any suitable pattern on any suitable spacing. The pattern and spacing suitable for a particular application are design criteria that one skilled in the art can alter to meet specific design requirements. FIGS. 1 and 3–5 show the serrations 4 arranged in a single row. If appropriate, the serrations 4 also may be arranged in two (FIG. 6) or more rows. Similarly, the size of the serrations 4 is a design criterion that may be selected to provide desired mechanical properties. Preferably, the serrations 4 will be taller than the consolidated thickness of the second structure 8 to which they will be joined to maximize fiber intermingling between the first structure 2 and second structure. If the second structure 8 will be formed from a cloth, it may be desirable to size the serrations 4 so they will fit between the warp and fill (also known as weft or woof) of the cloth. Although FIGS. 1 and 3–5 show serrations 4 oriented to form perpendicular joints with the second structure 8, the serrations may be machined to allow the first structure 2 to join the second structure 8 at any other desired angle. For joining at different angles, it may be desirable to machine the serrations at a corresponding angle. One skilled in the art will be able to identify the proper corresponding angle.

Figure 8:
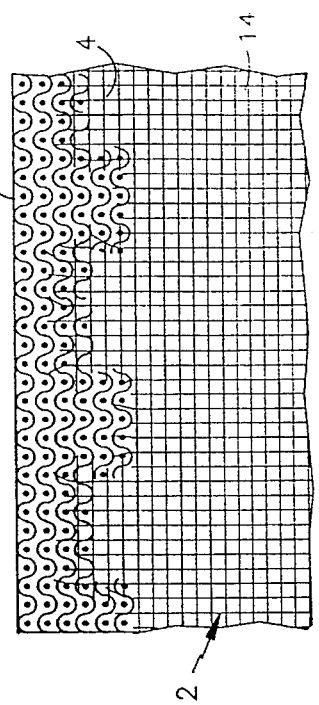
FIG. 8 is a schematic of the system of FIG. 7 after consolidation that shows intermingling between fibers from the two composite structures.
Figure 7:
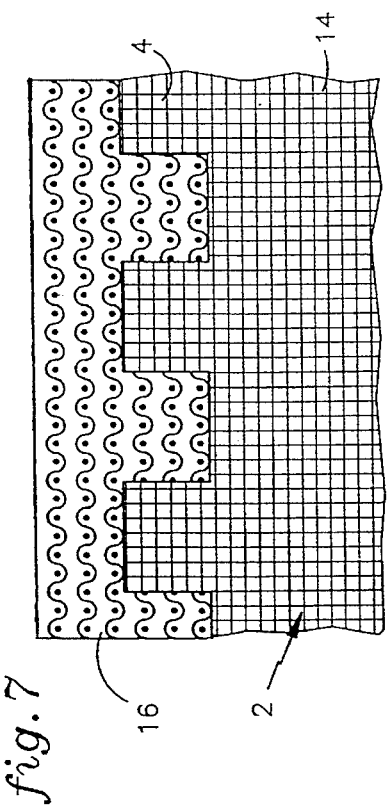
FIG. 7 is a schematic of six plies of unconsolidated woven cloth prepreg positioned around serrations on a consolidated composite structure.

After the serrations 4 are formed in the first structure 2, one or more reinforcing fiber plies 16 may be laid up around the serrations to form a precursor for the second structure 8. Each reinforcing fiber ply 16 may comprise a tow, a tape, a cloth, or chopped fiber material. The reinforcing fiber plies 16 may be preimpregnated with a matrix precursor, such as a glass, glass-ceramic, or ceramic powder or fiber, or impregnated with the matrix precursor after lay up. Alternately, reinforcing fiber plies 16 may be alternated with plies of a cloth of matrix material fibers. If desired, the reinforcing fiber plies 16 may be woven from both reinforcing fibers and matrix fibers. To ensure good intermingling between the fibers from the first structure 2 and second structure 8, at least one of the reinforcing fiber plies 16 should be positioned around the serrations 4 as shown in FIG. 7. If the reinforcing fiber ply 16 is a cloth, this can be done by positioning the serrations 4 between the warp and fill of the cloth. Arranging the reinforcing fiber ply 16 around the serrations 4 can be facilitated if the serrations are shaped to fit the weave of the cloth. If the reinforcing fiber ply 16 is a tow or a tape, the tow or tape may be arranged around the serrations 4 in any convenient manner. Preferably, more than one reinforcing fiber ply 16, for example at least four reinforcing fiber plies, will surround each serration 4. After laying up the reinforcing fiber plies 16 and any matrix fiber plies (if used), the entire assembly, including the consolidated first structure 2, is placed into suitable tooling, loaded into a hot press, autoclave, hot isostatic press, or any other suitable processing device, and heated and pressed to consolidate the reinforcing fiber plies 16 to form the second structure 8 with conventional methods. The temperature and pressure used to consolidate the second structure 8, causes the serrations 4 to deform as shown in FIG. 8. As a result, the fibers in the serrations 4 intermingle more intimately with the fibers from the second structure 8.

Figure 9:
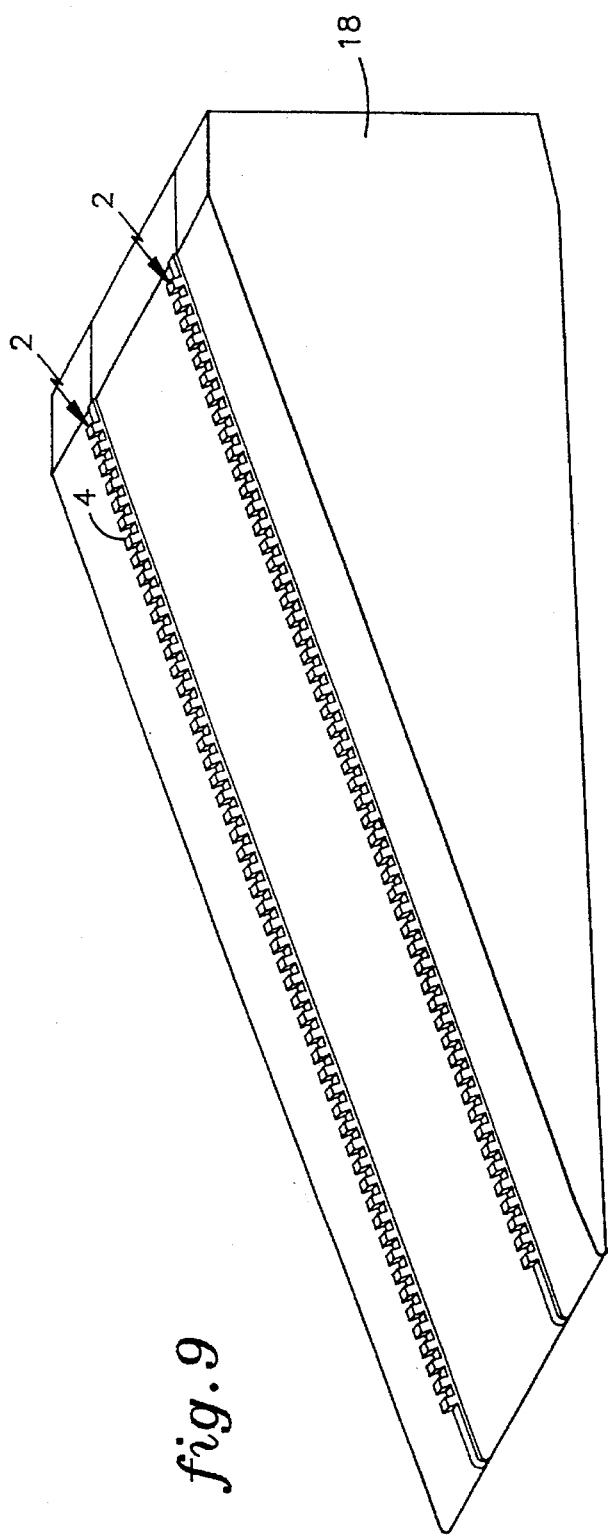
FIG. 9 is a perspective view of a graphite tool that may be used to aid the fabrication of an article of the present invention.
Figure 10:
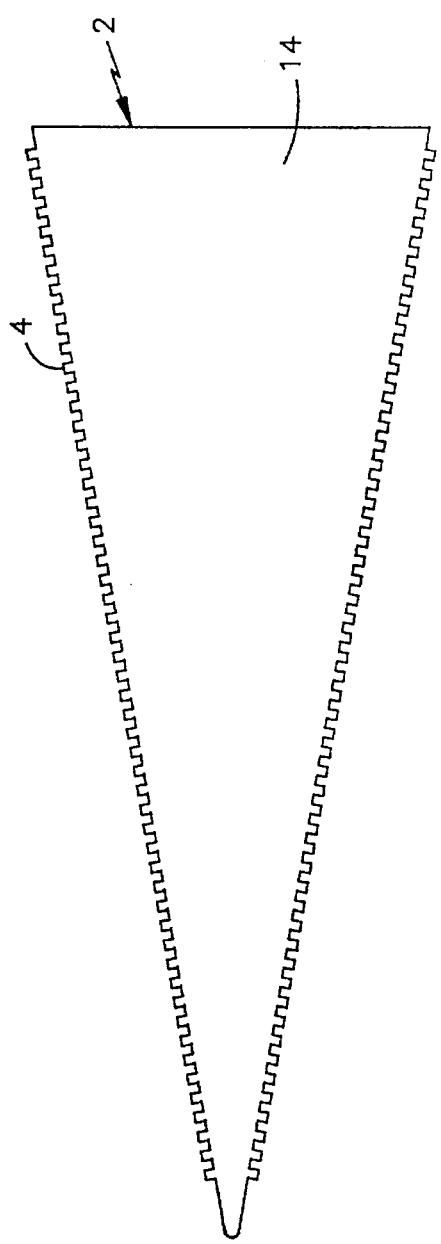
FIG. 10 is a plan view of a consolidated, wedge-shaped composite structure having serrations of the present invention.

During consolidation of the second structure 8 and the simultaneous joining of the second structure to the first structure 2, the first structure may be temporarily placed in a graphite tool 18, such as shown in FIG. 9. In this case, the tool 18 is shaped to hold a plurality of wedge-shaped first structures 2, such as those shown in FIG. 10. The tool 18 may be designed to expose only the serrations 4 of the first structure 2. By holding the first structure 2 securely in place, the tool 18 makes it easier to position the reinforcing fiber plies 16 around the serrations 4. After the second structure 8 is consolidated and joined to the first structure 2, the tool 18 may be removed in any convenient way. For example, the tool 18 may be coated with a conventional mold release agent, such as colloidal boron nitride, to facilitate removal or may be burned away under oxidizing conditions that do not detrimentally affect the first structure 2 and second structure 8 or the resulting composite article 10.

Figure 11:
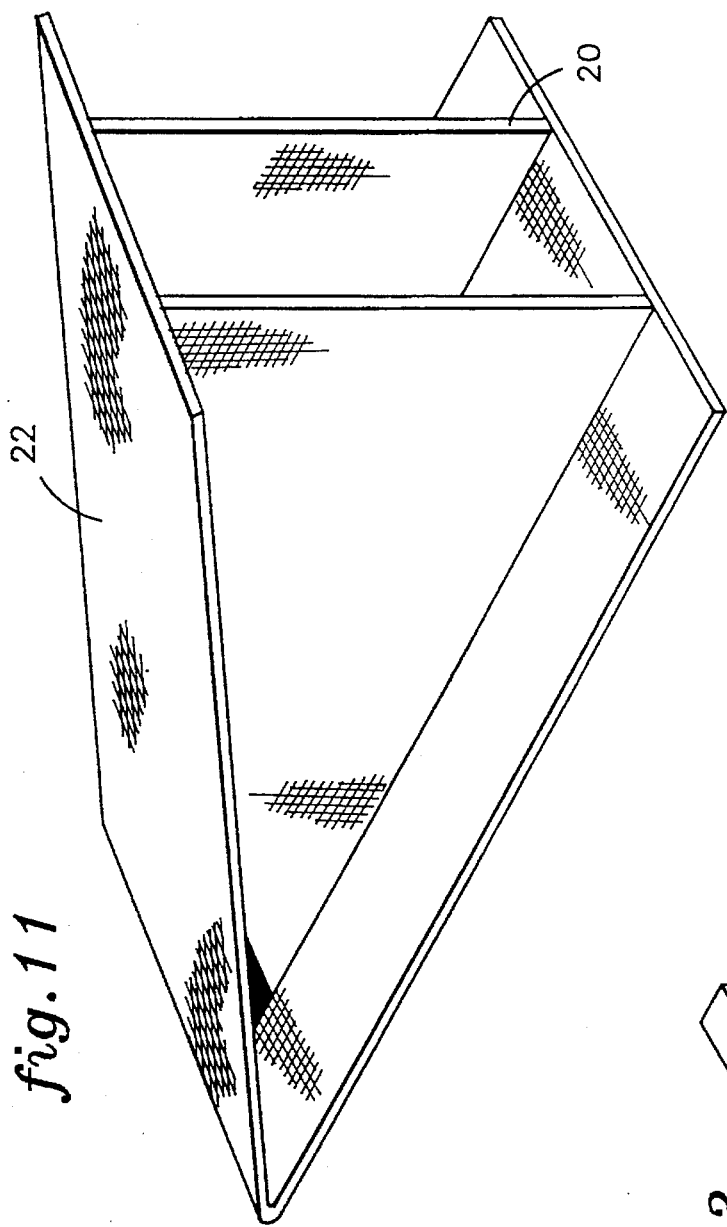
FIG. 11 is a perspective view of a rib-stiffened part made with the present invention.

The method of the present invention may be used to make composite structures in a variety of shapes and configurations. For example, the method of the invention may be used to make a component for a gas turbine exhaust structure that includes several vertical ribs 20 (corresponding to the first structure 2) and a face sheet 22 (corresponding to the second structure 8) that wraps around the ribs as shown in FIG. 11. One skilled in the art will recognize that the present invention also is capable of making articles with many other shapes and configurations.

The following examples demonstrate the present invention without limiting its broad scope.

EXAMPLE 1

(Present Invention Single Row of Serrations, 0°/90° & ±45° Cloth)

Figure 12:
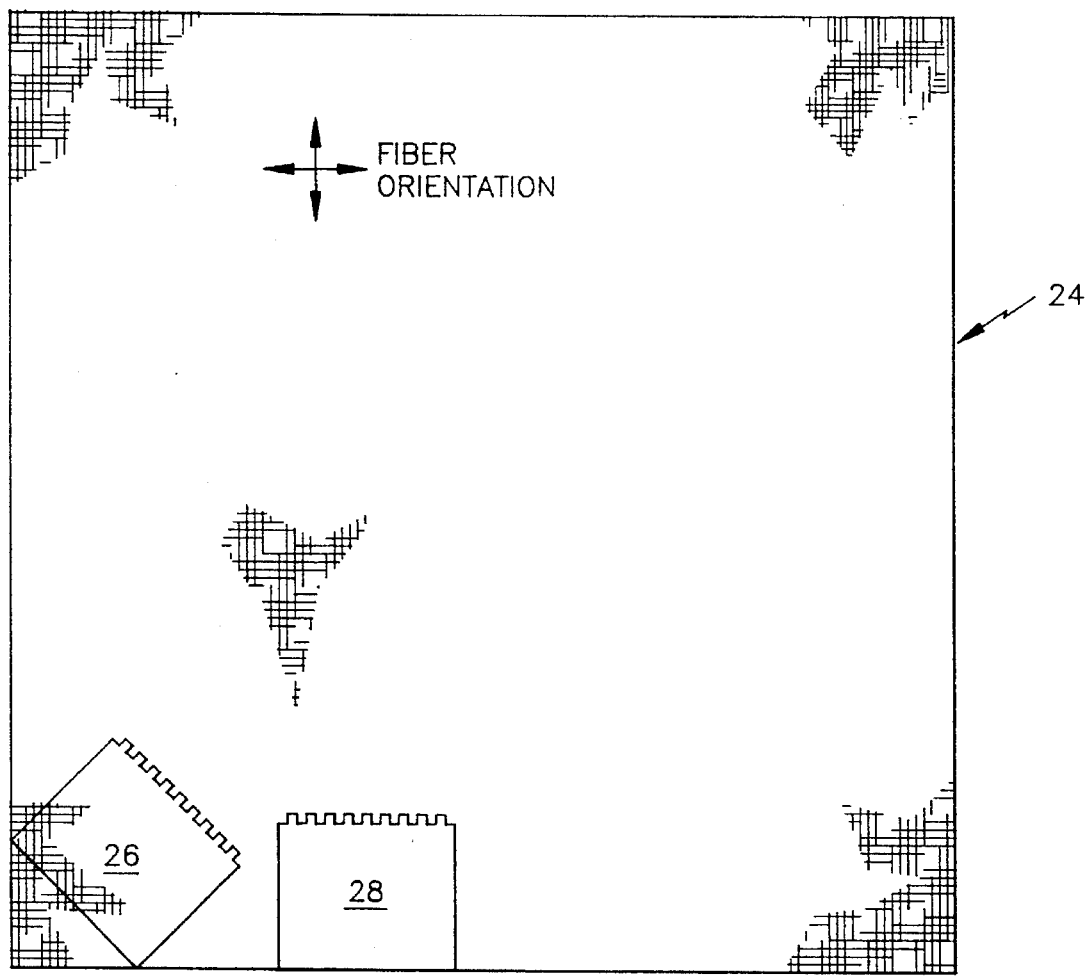
FIG. 12 is a perspective view of a composite panel used to form smaller panels having fiber orientations of ±45° and 0°/90°.

Four plies of plainweave (0°/90° fiber orientation) NICALON® fiber cloth (Nippon Carbon Company, Tokyo, Japan) were prepregged by dipping them into a slurry of 50 weight percent (wt %) Code 963 lithium aluminosilicate glass powder (Corning Inc., Corning, N.Y.) and isopropyl alcohol. After removing the cloth from the slurry, the alcohol was extracted under heat lamp dryers leaving cloth plies impregnated with glass powder. The four plies of cloth were laid up in a graphite die and hot pressed at 1350° C. and 6.9 MPa (1000 pounds per square inch) for 30 minutes to form a consolidated 20 cm×20 cm×0.1 cm (8 inches×8 inches× 0.039 inches) composite panel. During consolidation, the glass powder was densified to form the composite's matrix. After consolidating the composite panel 24, two smaller panels, one with a ±45° to the vertical fiber orientation 26 and another with a 0°/90° fiber orientation 28, were machined from it as shown in FIG. 12. The ±45° panel 26 was made by machining the composite panel 24 at a 45° angle with respect to the composite panel's fiber orientation. Both ±45° panel 26 and the 0°/90° panel 28 measured 3.35 cm×3.81 cm (1.32 inches×1.5 inches). Nine serrations were then cut into one edge of each machined panel. The serrations were each as thick as the panels and were 1.8 mm (0.07 inches) high, 2.1 mm (0.083 inches) wide, and spaced 2.1 mm (0.083 inches) apart. After the serrations were formed, the machined panels were placed into a graphite tool such that only the serrations protruded. Second panels were formed perpendicular to the first panels by laying up six plies of prepregged (with Corning Code 963 glass powder), plain weave (0°/90° fiber orientation) NICALON® fiber cloth over the serrations. The first two plies of the cloth were stretched over and around the serrations such that the serrations protruded between the warp and fill of the cloth. The entire assembly, comprising the first and second panels, was placed in a graphite die and hot pressed at 1350° C. and 6.9 MPa for 30 minutes to consolidate the second panel and simultaneously join it to the first panel to form "T"-shaped articles.

After completing the articles (one with 0°/90° fiber orientation in the first panel, on with ±45° fiber orientation in the first panel), several 1.2 cm (0.48 inches) wide "T"-shaped sections were cut from each article for testing. The horizontal portion of the "T" was affixed to an Instron testing machine (Model 4204, Instron Corporation, Canton Mass.) using a slotted hold-down fixture produced specifically for these tests and the vertical portion of the "T" was loaded to place the joint in tension. Tensile testing was performed at a crosshead speed of 0.5 mm/min (0.02 inches/min). Data from both samples are summarized in the Table below. Photomicrographs of the test pieces showed significant intermingling between the reinforcing fibers in the horizontal and vertical portions of the "T"-shaped sections.

EXAMPLE 2

(Present Invention Double Row of Serrations, ±45° Cloth)

Example 1 was repeated with a 3.35 cm×3.81 cm (1.32 inches×1.5 inches) first panel (machined from a 10.2 cm×10.2 cm panel) that was 0.38 cm (0.150 inches) thick and had a fiber orientation of ±45° to the vertical. Because of the panel's thickness, two parallel rows of serrations were machined into it. The serrations in the first row were 0.6 mm (0.025 inches) thick, while those in the second row were 1.9 mm (0.075 inches) thick. The rows were spaced 1.3 mm (0.050 inches) apart. Each serration was 3.8 mm (0.15 inches) high, 2.1 mm (0.083 inches) wide, and spaced 2.1 (0.083 inches) mm apart. After joining the first panel to a second panel, "T"-shaped sections were tested as in Example 1. Data from the testing are shown in the Table below. Photomicrographs of the test pieces showed significant intermingling between the reinforcing fibers in the horizontal and vertical portions.

EXAMPLE 3

(Present Invention Double Row of Serrations, ±15° Tape Layup)

Example 2 was repeated using fiber plies made from continuous tapes instead of a cloth to form the first panel. The continuous tapes were arranged to yield a ply orientation of ±15° to the vertical. As in Example 2, two rows of 3.8 mm (0.15 inches) high serrations were machined into the first panel. This time, the serrations penetrated five plies of the cloth used for the second panel, rather than two plies as in Examples 1 and 2. "T"-shaped sections of the article made in Example 3 were tested as in Examples 1 and 2. Data are reported in the Table. Photomicrographs of the test pieces showed significant intermingling between the reinforcing fibers in the horizontal and vertical portions. The test pieces themselves exhibited considerable fiber pull-out on testing and generated a large area under the stress-strain curve. These data indicate that the test pieces had a high work of fracture.

EXAMPLE 4

(Comparative Example No Serrations in Joint)

Figure 13:
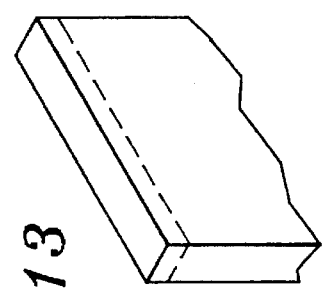
FIG. 13 is a perspective view of a prior art consolidated structure that does not incorporate the serrations of the present invention.

Another small first panel measuring 3.28 cm×3.81 cm (1.29 inches×1.5 inches) and having a ±45° fiber orientation was machined from the larger 0°/90° panel fabricated in Example 1. As shown in FIG. 13, however, no serrations were machined into this panel. Rather, it was arranged in the tool such that 1 mm (0.040 inches) of one edge of the panel extended above the tool. A second panel was fabricated above the first panel as in Example 1 to form a "T"-shaped article. The only "T"-shaped section of the article to survive processing was tested as in Examples 1–3. Data are reported in the Table. Photomicrographs of the test pieces showed an almost total lack of intermingling between the reinforcing fibers in the horizontal and vertical portions.

EXAMPLE 5

(Comparative Example Wrapped Joint)

Figure 14:
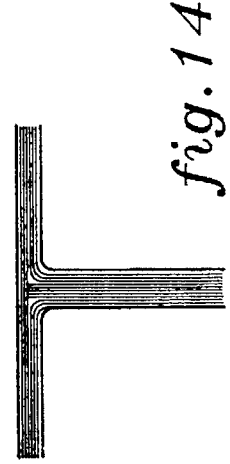
FIG. 14 is a perspective view of a prior art joint made from wrapped fiber plies.

A "T"-shaped article with continuous plies of cloth running between the vertical and horizontal portions of the article (FIG. 14) were fabricated in a hot press die designed to consolidate the article in a one step process. The article was made from plies of a prepregged (with Corning Code 963 glass powder), plain-weave (0°/90° fiber orientation) NICALON® fiber cloth. The composites were laid up such that the three outer plies of cloth on each side of the vertical portion of the "T" continued around a 1 mm (0.040 inches) radius to form the top three plies of the horizontal portion. In total, the horizontal portion of the "T" comprised five plies of the cloth and the vertical portion comprised nine plies of the cloth. "T"-shaped sections of the article were tested as in Examples 1–4. Data are reported in the Table. Photomicrographs of the test pieces showed continuous fibers running between the horizontal and vertical portions.

TABLE

| Example | Fiber Orientation of Vertical Panel | Serration Configuration | Cloth Plies Penetrated | Strength* MPa (ksi) | Notes |
| --- | --- | --- | --- | --- | --- |
| 1 | ±45° | single | 2 | 12–25 (1.8–3.6) | |
| 1 | 0°/90° | single | 2 | 23–24 (3.3–3.5) | |
| 2 | ±45° | double | 2 | 14–19 (2.0–2.7) | slotted serrations |
| 3 | ±15° (tape layup) | double | 5 | 17–27 (2.5–3.9) | slotted serrations |
| 4 | ±45° | none | 0 | 3 (0.5) | no serrations |
| 5 | NA | none | NA | 25–28 (3.6–4.0) | wrapped joint |

*Tensile Bearing Load

As expected, the wrapped joint articles made in Example 5 were equivalent to the strongest joints made with the present invention because they had continuous plies of reinforcing material connecting the horizontal and vertical portions of the test pieces. The articles made in Examples 1 and 3 were nearly as strong as those made in Example 5. Their strength arises from the intermingling of fibers between the two panels from which they were made, which permits greater load transfer under stress and increased work of fracture compared to joints that do not have intermingled fibers. The single article tested from Example 4 proved to be exceptionally weak because of an almost total lack of intermingling between the reinforcing fibers in the horizontal and vertical portions of the test piece.

The present invention provides several benefits over the prior art, particularly the ability to make composite articles having strong joints between adjacent, non-coplanar structures with relatively simple tooling. The simple tooling is possible because the panels or structures used to make articles of the present invention are consolidated independently of each other in at least two steps. By contrast, the prior art joint of Example 5 requires complex tooling to simultaneously consolidate the entire article. Although this may not be a major problem for articles with relatively simple geometries, such as the "T"-shaped article made in Example 5, it can become a major issue for more intricate geometries such as that shown in FIG. 11.

We claim:

1. A method of joining adjacent, non-coplanar, fiber reinforced composite structures, comprising the steps of:

(a) machining a plurality of serrations (4) into an edge (6) of a consolidated first fiber reinforced composite structure (2) such that reinforcing fibers are continuous from a main body (14) of the first fiber reinforced composite structure (2) into the serrations (4);

(b) laying up one or more reinforcing fiber plies (16) around the serrations (4) to form an unconsolidated second structure, such that the serrations (4) protrude through at least one reinforcing fiber ply (16), wherein the unconsolidated second structure comprises a matrix precursor in addition to the one or more reinforcing fiber plies (16); and (c) applying sufficient heat and pressure to the unconsolidated second structure and the serrations (4) to consolidate the second structure into a fiber reinforced composite structure (8) and to cause the fibers in the serrations (4) to intermingle with the fibers in the second structure (8) to securely join the second structure (8) to the first fiber reinforced composite structure (2).

2. The method of claim 1, wherein a plurality of serrations (4) are machined into the edge (6) of the first fiber reinforced composite structure (2).

3. The method of claim 2, wherein more than one row of serrations (4) is machined into the edge (6) of the first fiber reinforced composite structure (2).

4. The method of claim 1, wherein the serration (4) protrudes through at least four reinforcing fiber plies (16).

5. The method of claim 1, wherein the height of the serrations (4) before step (c) is greater than the thickness of the second structure (8) after it is consolidated.

6. The method of claim 1, wherein the serration (4) has a rectangular, keystone, arcuate, or notched cross-section.

7. The method of claim 1, wherein the reinforcing fibers continuing from the main body (14) of the first fiber reinforced composite structure (2) into the serration (4) are oriented at ±15° to the vertical.

8. The method of claim 1, wherein the reinforcing fibers continuing from the main body (14) of the first fiber reinforced composite structure (2) into the serration (4) are oriented at ±45° to the vertical.

9. The method of claim 1, wherein the reinforcing fibers continuing from the main body (14) of the first fiber reinforced composite structure (2) into the serration (4) are oriented at 0°/90° to the vertical.

10. The method of claim 1, wherein the main body (14) comprises prepregged chopped fibers.

11. The method of claim 1, wherein the reinforcing plies (16) comprise prepregged tape or chopped prepregged fiber.

* * * * *